United States Patent
Dornier et al.

(10) Patent No.: US 10,323,542 B2
(45) Date of Patent: Jun. 18, 2019

(54) SYSTEMS AND METHODS FOR A VISUAL ALIGNMENT SYSTEM

(71) Applicant: General Electric Company, Schenectady, NY (US)

(72) Inventors: Richard Garland Dornier, Houston, TX (US); Quoc Hoai Nguyen, Houston, TX (US)

(73) Assignee: General Electric Company, Schenectady, NY (US)

( * ) Notice: Subject to any disclaimer, the term of this patent is extended or adjusted under 35 U.S.C. 154(b) by 598 days.

(21) Appl. No.: 15/069,444

(22) Filed: Mar. 14, 2016

(65) Prior Publication Data

US 2017/0260878 A1    Sep. 14, 2017

(51) Int. Cl.
F01D 25/28    (2006.01)
G01B 11/27    (2006.01)
F01D 15/10    (2006.01)

(52) U.S. Cl.
CPC .......... *F01D 25/285* (2013.01); *F01D 15/10* (2013.01); *G01B 11/27* (2013.01); *F05D 2220/30* (2013.01); *F05D 2220/76* (2013.01); *F05D 2230/64* (2013.01)

(58) Field of Classification Search
CPC ............................. F01D 25/285; G01B 11/27
USPC ......................... 33/286, 1 BB, 263, 264, 297
See application file for complete search history.

(56) References Cited

U.S. PATENT DOCUMENTS

| | | | | |
|---|---|---|---|---|
| 958,736 A * | 5/1910 | Ferris | .................... | G01C 15/004 33/286 |
| 2,834,111 A * | 5/1958 | Sweany | ............... | G01B 11/306 33/286 |
| 3,704,522 A * | 12/1972 | Blubaugh | ................. | F16M 7/00 33/286 |
| 3,723,013 A * | 3/1973 | Stirland | ................. | G01B 11/26 250/204 |
| 3,873,823 A * | 3/1975 | Northrup | ............. | G01C 15/002 33/286 |
| 3,910,533 A * | 10/1975 | Cheatham | ............... | B64G 1/646 244/172.4 |
| 4,257,706 A * | 3/1981 | Smith | ........................ | B60R 1/02 116/28 R |
| 4,285,138 A | 8/1981 | Berry | | |
| 4,709,485 A * | 12/1987 | Bowman | .............. | G01B 11/272 33/228 |
| 5,113,588 A * | 5/1992 | Walston | ................... | B60D 1/36 280/477 |

(Continued)

OTHER PUBLICATIONS

U.S. Appl. No. 14/489,323, filed Sep. 17, 2014, Raymond Ka Lok Fong.

*Primary Examiner* — Christopher W Fulton
(74) *Attorney, Agent, or Firm* — Fletcher Yoder, P.C.

(57) ABSTRACT

An alignment system includes a first visual indicia and a second visual indicia disposed on a first mobile unit, and a third visual indicia and a fourth visual indicia disposed on a second mobile unit. The alignment system also includes a visual inspection area configured to enable collective viewing of the first visual indicia, the second visual indicia, the third visual indicia, and the fourth visual indicia along a single direction. The alignment system is configured to align the first mobile unit with the second mobile unit along a vertical axis, a horizontal axis, and a rotational axis to help align a rotational coupling between the first mobile unit and the second mobile unit.

20 Claims, 5 Drawing Sheets

(56) References Cited

U.S. PATENT DOCUMENTS

| | | | | |
|---|---|---|---|---|
| 5,224,270 | A | * | 7/1993 | Burrus ............... B60D 1/36 280/477 |
| 5,274,432 | A | * | 12/1993 | Parent ............... B60R 1/00 33/264 |
| 5,402,226 | A | * | 3/1995 | Matthews ........... G01B 11/26 33/285 |
| 6,102,423 | A | | 6/2000 | Beck et al. |
| 6,273,448 | B1 | * | 8/2001 | Cross ............... B60D 1/36 280/477 |
| 6,409,200 | B1 | | 6/2002 | Glass |
| 6,628,378 | B1 | * | 9/2003 | Marangoni ......... G01B 11/27 33/286 |
| 6,858,957 | B2 | | 2/2005 | Ortt et al. |
| 2003/0037449 | A1 | * | 2/2003 | Bani-Hashemi ..... B25J 9/1689 33/286 |
| 2003/0189705 | A1 | * | 10/2003 | Pardo ............... G01B 11/27 356/401 |
| 2016/0075387 | A1 | * | 3/2016 | Fong ............... B62D 63/08 403/14 |

* cited by examiner

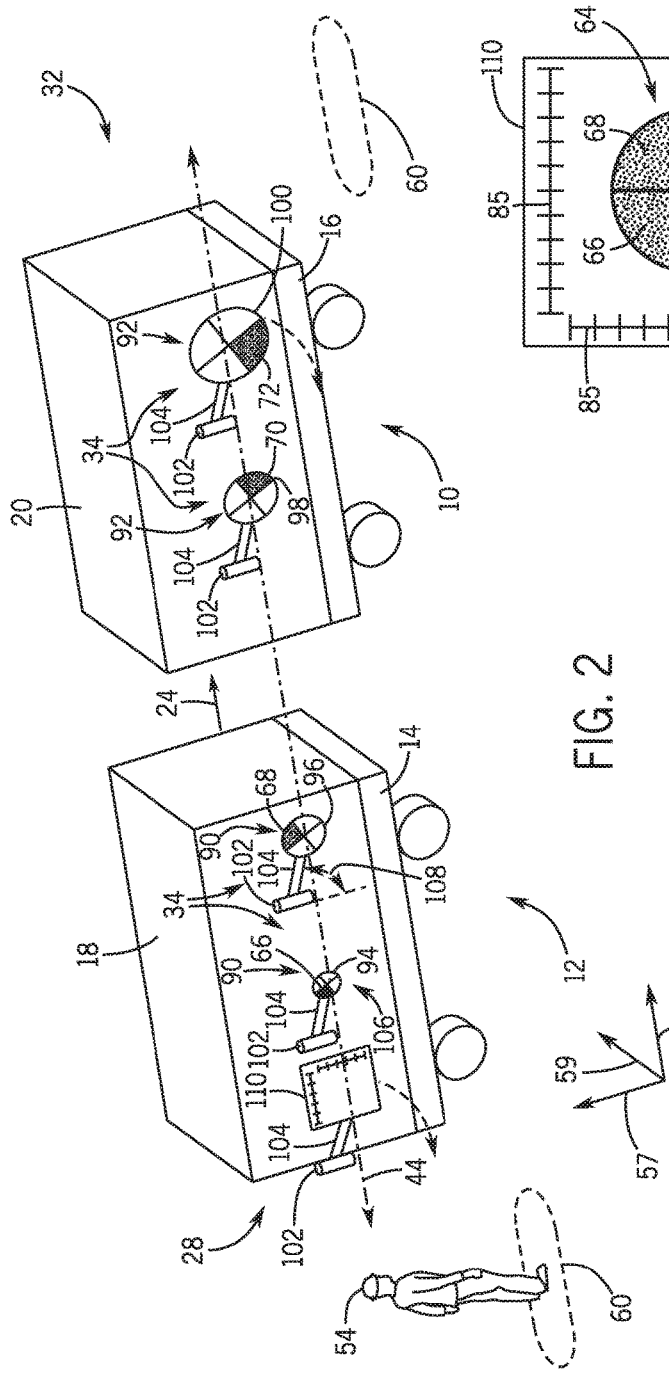
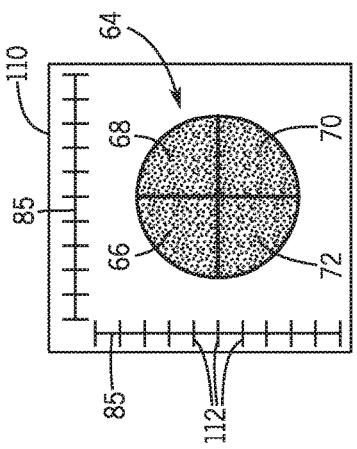
FIG. 2
FIG. 3

SYSTEMS AND METHODS FOR A VISUAL ALIGNMENT SYSTEM

BACKGROUND OF THE INVENTION

The subject matter disclosed herein relates to gas turbine systems, and more particularly to systems and methods for aligning mobile machinery with a visual target.

Gas turbines are used in many land and marine based applications. For example, a gas turbine may be coupled to a generator to generate power for an electrical power grid. The process of coupling the gas turbine to the generator may utilize various alignment techniques that may take as long as a few hours to a few days, depending on external conditions. This downtime of the gas driven generator may result in lost revenues, brown outs, or black outs. Accordingly, it may be beneficial to provide systems and methods for efficient alignment techniques between gas turbines and generators. Furthermore, it may be beneficial to provide systems and methods for alignment techniques that may be easily implemented on the field.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a first visual indicia and a second visual indicia disposed on a first mobile unit, and a third visual indicia and a fourth visual indicia disposed on a second mobile unit. The alignment system also includes a visual inspection area configured to enable collective viewing of the first visual indicia, the second visual indicia, the third visual indicia, and the fourth visual indicia along a single direction. The alignment system is configured to align the first mobile unit with the second mobile unit along a vertical axis, a horizontal axis, and a rotational axis to help align a rotational coupling between the first mobile unit and the second mobile unit.

In a second embodiment, a system includes a first visual indicia and a second visual indicia disposed on a first mobile unit that supports a turbine engine. The system also includes a third visual indicia and a fourth visual indicia disposed on a second mobile unit that supports a generator. The system also includes a visual inspection area configured to enable collective viewing of the first visual indicia, the second visual indicia, the third visual indicia, and the fourth visual indicia along a single direction. The alignment system is configured to align the first mobile unit with the second mobile unit along a vertical axis, a horizontal axis, and a rotational axis to help align a rotational coupling between the turbine engine and the generator.

In a third embodiment, a system includes a first mobile unit supporting a turbine engine and a second mobile unit supporting a generator. The system also includes an alignment system configured to help align the coupling between the first mobile unit and the second mobile unit along a vertical axis, a horizontal axis, and a rotational axis. The alignment system includes a first visual indicia and a second visual indicia disposed on the first mobile unit, and a third visual indicia and a fourth visual indicia disposed on the second mobile unit. The alignment system also includes a control system configured to receive a visual of a target visualization. The target visualization includes the first visual indicia, the second visual indicia, the third visual indicia, and the fourth visual indicia along a single direction.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 2 is a perspective view of an embodiment of the visual alignment system of FIG. 1, where the visual alignment system includes two turbine indicia coupled to the turbine and two generator indicia coupled to the generator;

FIG. 3 is an embodiment of a target visualization of the visual alignment system of FIG. 2;

DETAILED DESCRIPTION OF THE INVENTION

Figure 1:
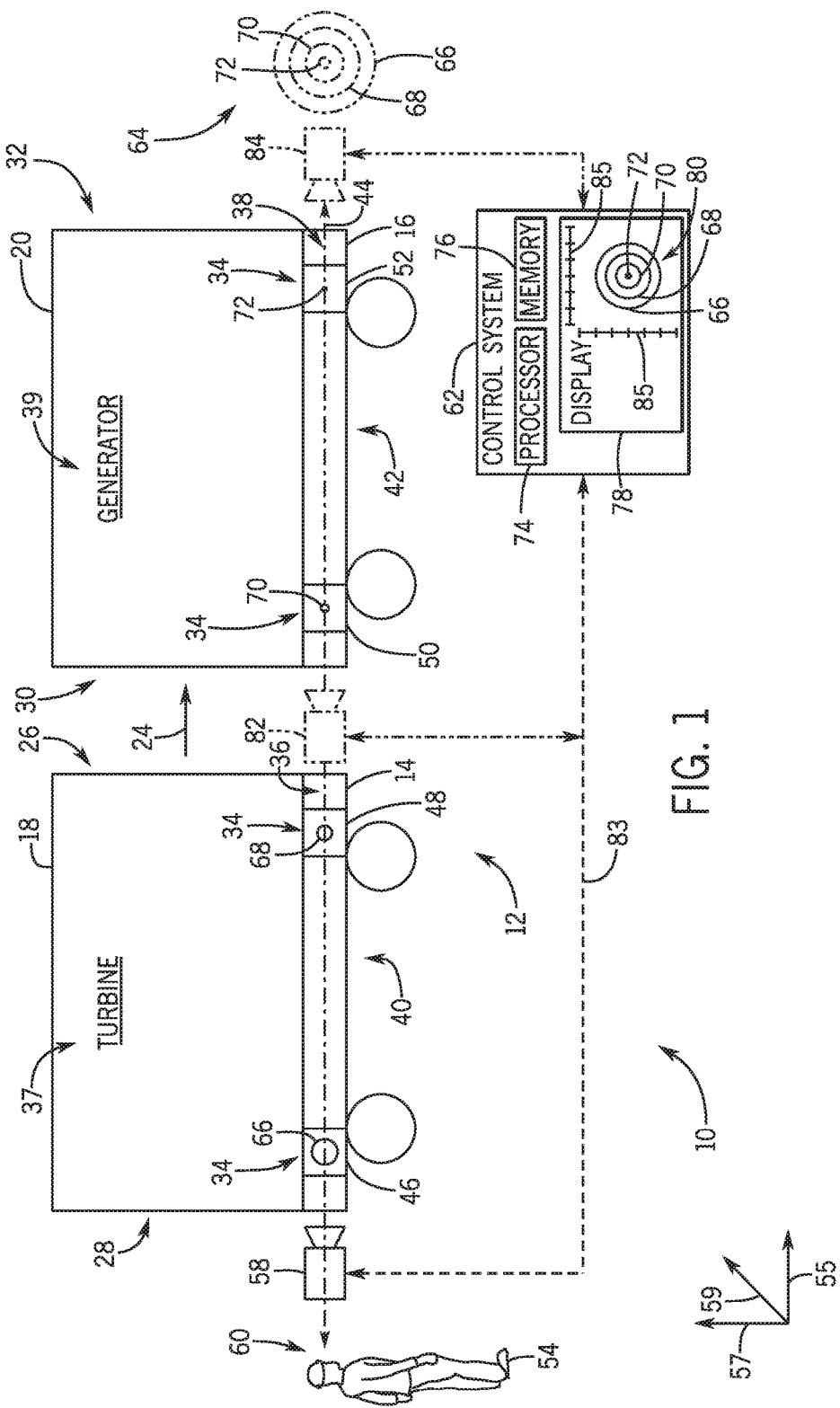
FIG. 1 is embodiment of a turbine system illustrating a visual alignment system coupled to a turbine trailer and a generator trailer.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to systems for a visual alignment system configured to aid in the alignment of a gas turbine trailer with a generator trailer, thereby aligning a gas turbine with a generator. In some situations, a mobile gas turbine generator system may be transported to a location in need of electricity, such as during an emergency, natural disaster, or other event resulting in insufficient electricity. In such situations, the visual alignment system may help an operator align the turbine to the generator. Specifically, the visual alignment system may help an operator visually evaluate the alignment of the gas turbine trailer with the generator trailer during the alignment and/or coupling of the gas turbine to the generator. In certain embodiments, the visual alignment system may provide an indication of misalignment, thereby allowing the operator to correct the alignment between the turbine trailer and the generator trailer before the gas turbine is coupled to the generator.

The visual alignment system may help reduce misalignment between the turbine trailer and generator trailer, thereby helping to reduce misalignment between the generator and the turbine during the coupling process. Without the disclosed embodiments, alignment techniques utilized in the field to align the gas turbine with the generator may take up to a few hours or a few days depending on various environmental factors. Accordingly, the time saved with the disclosed embodiments enables faster installation, thereby helping to reduce downtime of system components and revenue lost.

In certain embodiments, the visual alignment system may include a plurality of visual indicia disposed on the turbine trailer and a plurality of visual indicia disposed on the generator trailer. Specifically, the visual indicia may be disposed on an external surface of the turbine trailer and the generator trailer along a single axis, or line of sight. For example, the visual indicia may be disposed parallel and along the outside of a turbine trailer spine that extends along the length of the turbine trailer and a generator trailer spine that extends along the length of the generator trailer. In particular, each visual indicia of the plurality of visual indicia may incorporate a visual component of a target visualization. For example, the target visualization may be a complete pattern or picture that is viewed by the operator and/or captured by a camera. In particular, each visual indicia of the plurality of visual indicia may include a visual component that includes a portion of the complete pattern or picture. In this manner, when the plurality of visual indicia are collectively viewed along the line of sight, each individual visual component disposed on a visual indicia form the complete pattern of the target visualization. For example, the two visual indicia disposed on a turbine trailer, when viewed together with the two visual indicia disposed on a generator trailer, may form a target visualization (e.g., a complete pattern or picture) that includes the visual components (e.g., portions of the complete pattern or picture) disposed on the four visual indicia. In certain embodiments, the target visualization may provide an indication of alignment or misalignment between the generator trailer and the turbine trailer, as further described in detail below.

During operation, an operator may utilize the plurality of visual indicia as a guide to align the turbine trailer with the generator trailer. For example, in certain embodiments, as noted above, the operator may collectively view the plurality of indicia along a line of sight to view the target visualization. In certain embodiments, a target visualization that includes aligned visual components may be indicative of alignment between the turbine trailer and the generator trailer. For example, a target visualization having aligned markings and/or a complete pattern may indicate alignment between the turbine trailer and the generator trailer (and an alignment between the turbine and the generator). Likewise, a target visualization having misaligned markings or an incomplete pattern may be indicative of a misalignment between the turbine trailer and generator trailer (and a potential misalignment between the turbine and the generator). In certain embodiments, the plurality of visual indicia may provide an indication of alignment in a vertical direction, a horizon direction, and a rotational direction between the turbine trailer and the generator trailer. Furthermore, in certain embodiments, the target visualization may include an alignment scale that an operator may utilize to gather information related to the degree of the misalignment between the turbine trailer and generator trailer, if any. Accordingly, in certain embodiments, when the plurality of visual indicia are collectively viewed, the visual components disposed on the visual indicia may provide an indication of how to correct the misalignment to the operator.

In certain embodiments, an operator may view the target visualization from a visual inspection area and make any necessary adjustments to the positioning of the generator trailer and turbine trailer during alignment. The visual inspection area may be any space from which the plurality of visual indicia may be collectively viewed along the line of sight or in a single direction. In certain embodiments, a camera communicatively coupled to a control system may be disposed in the visual inspection area, and provide a visual of the target visualization. In certain embodiments, the camera may view the target visualization from the visual inspection area and may be configured to provide a visual of the target visualization on a display of the control system. During alignment and/or coupling procedures, the operator may utilize the display and/or the control system executing and/or monitoring a variety of field device configuration and monitoring applications.

Turning now to the drawings, FIG. 1 is a block diagram of an embodiment of a turbine system 10 illustrating a visual alignment system 12. The turbine system 10 includes a turbine trailer 14 and a generator trailer 16 that may be configured to transport turbomachinery (e.g., one or more sections of the turbine system 10) from one location to another, such as, for example, from an installation site to a commissioning site, a commissioning site to a remote location, and so forth. For example, in the illustrated embodiment, the turbine trailer 14 may be configured to move a turbine 18 (e.g., a gas turbine engine, a steam turbine, a hydroturbine, a wind turbine, or any turbine system) into alignment with the generator 20 before the turbine 18 is coupled to the generator 20. Likewise, the generator trailer 16 may be configured to move a generator 20 into a position where it may be aligned with the turbine 18. In particular, the visual alignment system 12 may be configured to aid in the alignment of the turbine trailer 14 with the generator trailer 16, thereby helping to align the turbine 18 with the generator 20, as further described in detail below.

As noted above, in some situations, such as during an emergency situation in which a location is in need of electricity, the turbine trailer 14 and the generator trailer 16 may be utilized to move and couple the turbine 18 and the generator 20. For example, the generator trailer 16 supporting the generator 20 may be moved into a first position. In certain embodiments, the turbine trailer 14 supporting the turbine 18 may move in a reverse direction 24 into the generator trailer 16, such that a tail end 26 of the turbine trailer 14 (e.g., relative to a head end 28 of the turbine trailer 14) is moved towards a tail end 30 of the generator trailer 16 (e.g., relative to a head end 32 of the generator trailer 16). In certain embodiments, the turbine trailer 14 may move in the reverse direction 24 to rotationally couple with the generator trailer 16. In such embodiments, the generator trailer 16 may remain stationary in the first position while the turbine trailer 14 is moved in the reverse direction 24 into the first position so that the turbine 18 may be coupled to the generator 20. While the illustrated embodiments describe the turbine trailer 14 moving in the reverse direction 24 as the generator trailer 20 is stationary, it should be noted that in other embodiments, the generator trailer 16 may move towards the stationary turbine trailer 14 and/or both trailers 14, 16 may move towards one another during the alignment and coupling process.

In some embodiments, the visual alignment system 12 may be utilized to help properly align the turbine 18 with the generator 20 as the turbine 18 is coupled to the generator 20, such as during the alignment and coupling process. For example, the visual alignment system 12 may include a plurality of visual indicia 34 (e.g., 2, 3, 4, 5, 6, 7, 8, 9, 10 or more) that are disposed on a first exterior surface 36 of the turbine trailer 14 or a second exterior surface 37 of the turbine 18. Further, the visual alignment system 12 may include a plurality of visual indicia 34 (e.g., 2, 3, 4, 5, 6, 7, 8, 9, 10 or more) that are disposed on a third exterior surface 38 of the generator trailer 16 or a fourth exterior surface 39 of the generator 16. For example, in certain embodiments, the plurality of visual indicia 34 may be disposed on the first and third exterior surfaces 36, 38, such as along the length of a turbine trailer spine 40 and the length of a generator trailer spine 42. As a further example, in certain embodiments, the plurality of visual indicia 34 may be disposed anywhere on the second and fourth exterior surface 37, 39, such as on the outer housing of the turbine 18 and the generator 20.

In particular, in certain embodiments, the plurality of visual indicia 34 may be disposed along a line of sight 44. For example, in the illustrated embodiment, a first visual indicia 46 and a second visual indicia 48 are disposed on the first exterior surface 36 of the turbine trailer 14, along the length of the turbine trailer spine 40. Likewise, a third visual indicia 50 and a fourth visual indicia 52 are disposed on the third exterior surface 38 of the generator trailer 16, along the length of the generator trailer spine 42. In particular, the first visual indicia 46, the second visual indicia 48, the third visual indicia 50, and the fourth visual indicia 52 may be disposed along the line of sight 44, which may extend along a longitudinal direction or axis 55 of the system 10. Indeed, it may be beneficial to ensure that the length of the turbine trailer spine 40 is approximately straight relative to the generator trailer spine 42 to help ensure the proper coupling of the turbine 18 with the generator 20. Accordingly, in certain embodiments, the plurality of visual indicia 34 may be utilized to provide an indication of the alignment between the turbine trailer 14 and the generator trailer 16. For example, in certain embodiments, an operator 54 in a visual inspection area 60 may collectively view the plurality of visual indicia 34 along the line of sight 44, as further described below. In certain embodiments, a camera 58 disposed in a visual inspection area 60 and communicatively coupled to a control system 62 may be configured to collectively view the plurality of visual indicia 34 along the line of sight 44, as further described in detail below.

In certain embodiments, when viewed collectively, the plurality of visual indicia 34 may provide an indication of the alignment between the turbine trailer 14 and the generator trailer 16 during the alignment and coupling process. For example, in certain embodiments, each visual indicia 34 (e.g., the first visual indicia 46, the second visual indicia 48, the third visual indicia 50, and the fourth visual indicia 52) of the plurality of visual indicia 34 may incorporate a visual component of a target visualization 64. For example, the target visualization 64 may be a visual (e.g., a pattern or a picture) that is seen by the operator 54 and/or captured by the camera 58. Each visual indicia 34 of the plurality of visual indicia 34 may include a portion of the target visualization 64 (e.g., a portion of the complete pattern or picture) that is disposed thereon. For example, the first visual indicia 46 may include a first portion 66 of the target visualization 64, the second visual indicia 48 may include a second portion 68 of the target visualization 64, the third visual indicia 50 may include a third portion 70 of the target visualization 64, and the fourth visual indicia 52 may include a fourth portion 72 of the target visualization 64.

Accordingly, the operator 54 may utilize the target visualization 64 as an indication of the alignment between the turbine trailer 14 and the generator trailer 16. For example, in certain embodiments, the target visualization 64 may provide an indication of alignment to the operator 54 when the visual components 66, 68, 70, and 72 are aligned relative to one another and form a complete and accurate pattern or picture, as further described with respect to FIGS. 4 and 5. Likewise, the target visualization 64 may provide an indication of misalignment to the operator 54 when the visual components 66, 68, 70, and 72 are misaligned relative to one another and/or otherwise do not form a complete and accurate pattern or picture, as further described with respect to FIG. 6.

In certain embodiments, the visual alignment system 12 may be communicatively coupled to the control system 62, which includes a processor 74, a memory 76, and a display 78. The memory 76 may include any suitable non-transitory, tangible, computer-readable medium having executable instructions. The control system 62 may be suitable for executing a variety of field device configuration and monitoring applications, and for providing an operator interface (e.g., the display 78) through which an operator 54 (e.g., engineer or technician) may monitor the components of the system 10. The control system 62 may be any type of computing device suitable for running software applications, such as a laptop, a workstation, a tablet computer, or a handheld portable device (e.g., personal digital assistant or cell phone). Indeed, the control system 62 may include any of a variety of hardware and/or operating system platforms. In some embodiments, the computer may host industrial control software, such as a human-machine interface (HMI) software, a manufacturing execution system (MES), a distributed control system (DCS), a supervisor control and data acquisition (SCADA) system, and so forth.

In particular, in certain embodiments, the target visualization 64 may be captured by the camera 58 from the visual inspection area 60, and an image 80 of the target visualization 64 may be displayed on the display 78 within the control system 62. In certain embodiments, the control system 62 may be communicatively coupled via wired and/or wireless communications 83 to components of the visual alignment system 12, such as the camera 58. It should be noted that in certain embodiments, one or more cameras, such a second camera 82 or a rear camera 84, may be disposed throughout the system 10 along the line of sight 44 to provide an indication of alignment. In particular, each of the one or more cameras may capture different images of the system 10 which may be utilized to provide a collective image along the line of sight 44 and the plurality of visual indicia 34. For example, in the illustrated embodiment, the rear camera 84 may be utilized to capture an image of the plurality of visual indicia 34 along the line of sight 44 to form the target visualization 64.

As noted above, in certain embodiments, an image 80 of the target visualization 64 captured by the camera 58 may be displayed on the display 78. Specifically, the operator 54 may utilize the display 78 to view the image 80 of the target visualization 64. As noted above, the target visualization 64 may be a visual of the plurality of visual indicia 34 when collectively viewed along the line of sight 44 in one direction (e.g., the longitudinal axis or direction 55). In particular, the operator 54 may view the image 80 to evaluate the alignment of the plurality of visual indicia 34 relative to each other. For example, as noted above, the target visualization 64 may provide an indication of alignment to the operator 54 when the visual components 66, 68, 70, and 72 are aligned relative to one another and form a complete and accurate pattern or picture, as further described with respect to FIGS. 4 and 5. Likewise, the target visualization 64 may provide an indication of misalignment to the operator 54 when the visual components 66, 68, 70, and 72 are misaligned relative to one another and/or otherwise do not form a complete and accurate pattern or picture, as further described with respect to FIG. 6.

In certain embodiments, the display 78 may include an alignment scale 85 (e.g., misalignment scale, scale, etc.) that provides an indication of the degree of the misalignment between the turbine trailer 14 and generator trailer 16, if any. For example, in certain embodiments, the visual components 66, 68, 70, and 72 disposed on the plurality of visual indicia 34 may be misaligned related to one another, such that the target visualization 64 does not form a complete or accurate pattern or picture. In certain embodiments, the alignment scale 85 may be utilized to determine the degree of misalignment between the turbine trailer 14 and generator trailer 16. For example, the alignment scale 85 may be utilized to measure, for example, a misalignment on the image 80 between the first visual component 66 and the second visual component 68. The measurement on the alignment scale 85 may correlate to a distance (or another physical parameter) to adjust the turbine trailer 14 in order to properly align the turbine trailer 14 and the generator trailer 16.

In certain embodiments, the operator 54 may collectively view the plurality of visual indicia 34 from the visual inspection area 60, and may evaluate the target visualization 64 with a naked eye. As noted above, the visual inspection area 60 may be any area of space in the system 10 where the plurality of visual indicia 34 may be collectively viewed along the line of sight 44 in a single direction (e.g., the longitudinal direction 55). For example, the operator 54 may collectively view the visual components 66, 68, 70, and 72 from the visual inspection area 60 to determine whether the visual components 66, 68, 70, and 72 are generally aligned relative to one another and generally form a complete and accurate target visualization 64. In particular, the operator 54 may be configured to evaluate the visual components 66, 68, 70, and 72 during the alignment and coupling process, such as during the alignment period when the turbine trailer 14 supporting the turbine 18 moves in the reverse direction 24 into the generator trailer 16. In certain situations, the operator 54 may visually evaluate the plurality of visual indicia 34 and the target visualization 64 with a naked eye to determine the alignment of the turbine trailer 14 with the generator trailer 16, as further described with respect to FIG. 2.

In the following discussion, reference may be made to an axial direction or axis 55 (e.g., the longitudinal axis 55) of the system 10, a radial direction or axis 57 (e.g., vertical axis 57) of the system 10, and a rotational direction or axis 59 of the system 10.

FIG. 2 is a perspective view of an embodiment of the visual alignment system 12 of FIG. 1. The visual alignment system 12 includes turbine indicia 90 coupled to the first exterior surface 37 of the turbine 18 and generator indicia 92 coupled to the second exterior surface 38 of the generator 20. The first and second exterior surfaces 37, 38 may include any portion of the exterior (e.g., top surface, bottom surface, side surfaces, etc.) of the turbine 14 and/or the generator 16. In certain embodiments, the first and second exterior surfaces 37, 38 (e.g., sidewalls, trailers, etc.) may include one or more portions of a housing or an enclosure of the turbine 14 and/or the generator 16. It should be noted that in certain embodiments, the plurality of visual indicia 34 (e.g., the turbine indicia 90 or the generator indicia 92) may be coupled to an exterior surface of the turbine trailer spine 40 or the generator trailer spine 42. In certain embodiments, any number of turbine indicia 90 (e.g., 1, 2, 3, 4, 5, 6, 7, 8, 9, 10 or more turbine indicia 90) and generator indicia 92 (e.g., 1, 2, 3, 4, 5, 6, 7, 8, 9, 10 or more generator indicia 92) may be coupled to the first and second exterior surfaces 37, 38 of the turbine 18 and the generator 20. As noted above, the operator 60 may be configured to utilize the plurality of visual indicia 34 to evaluate the alignment of the turbine trailer 14 relative to the generator trailer 16 during the alignment and coupling process of the turbine 18 with the generator 20.

In certain embodiments, the turbine indicia 90 may include a first turbine indicia 94 and a second turbine indicia 96, and the generator indicia 92 may include a first generator indicia 98 and a second generator indicia 100. In the illustrated embodiment, the turbine indicia 90 and/or the generator indicia 96 may be coupled to the first and second exterior surfaces 37, 38 of the turbine 18 and the generator 20 with an attachment feature 102. In certain embodiments, the attachment feature 102 may be a fastener or latch coupled to the first and second exterior surfaces 37, 38. In certain embodiments, the attachment feature 102 may include one or more threaded fasteners (e.g., screws, nuts, bolts, clamps, mounting brackets, male/female joints (e.g., dovetail joints), clamps, welds, rotational joints (e.g., hinges), etc.) or any other type of fastener or latch configured to securely attach the plurality of visual indicia 34 to the exterior of the turbine 18, the generator 20, the turbine trailer 14, and/or the generator trailer 16.

In certain embodiments, the attachment feature 102 (e.g., rotational joint) may allow the turbine indicia 90 and/or the generator indicia 92 to rotatably swing between a retained position 106 (e.g., inward position) and a released position 108 (e.g., outward position). In the retained position 106 (e.g., retracted position), the turbine indicia 90 and/or the generator indicia 92 may be positioned approximately flush against the first and second exterior surfaces 37, 38. In the released position 108 (e.g., extended position), the turbine indicia 90 and/or the generator indicia 92 may swing outward at an angle 108 of approximately 20 degrees, 30 degrees, 40 degrees, 50 degrees, 60 degrees, 70 degrees, 80 degrees, 90 degrees, or more. For example, in certain embodiments, the released position 108 may position the turbine indicia 90 and/or the generator indicia 92 approximately perpendicular to the first and second exterior surfaces 37, 38. In certain embodiments, the attachment feature 102 may include an extension feature 104 (e.g., extension rod or piece) that allows the plurality of visual indicia 34 to extend away from the first and second exterior surfaces 37, 38 in the released position 108. In particular, the released position 108 may be approximately the same for each of the plurality of visual indicia 34 within the system 10. Furthermore, the released position 108 may position each of the plurality of visual indicia 34 along the same line of sight 44, in the same direction (e.g., the longitudinal direction 55). It should be noted that in certain embodiments, the plurality of visual indicia 34 (e.g., the turbine indicia 90 and the generator indicia 92) may be coupled to the exterior of the turbine 18, the generator 20, the turbine trailer 14, and/or the generator trailer 16 in the released position 108, such that they do not rotate between the retained position 106 and the released position 108, but are fixed in the released position 108.

As noted above, the operator 54 may be positioned within the visual inspection area 60 and in-line with the plurality of visual indicia 34 to collectively view the plurality of visual indicia 34 (e.g., the turbine indicia 90 and the generator indicia 92). The visual inspection area 60 may be position anywhere within the field convenient for collectively viewing the plurality of visual indicia 34. For example, in the illustrated embodiment, the visual inspection area 60 is positioned proximate to the head end 28 of the turbine trailer 14, and this area may be utilized when the turbine trailer 14 is moving in the reverse direction 24 towards the generator trailer 16. In other embodiments, the visual inspection area 60 may be positioned proximate to the head end 32 of the generator trailer 16, or generally anywhere within the system 10 suitable for collectively viewing the plurality of visual indicia 34.

In certain embodiments, the operator 54 may utilize a viewing device 110 in-line with the plurality of visual indicia 34 to collectively view the plurality of visual indicia 34. For example, the viewing device 110 may be a viewing scope, lens (e.g., magnifying lens), or a manual inspection port that the operator 54 may utilize from the visual inspection area 60 to collectively view the plurality of visual indicia 34. In certain embodiments, the viewing device 110 may include one or more features that enhance the operator viewing experience, such an eyepiece or an inspection port to focus the operator's line of sight 44 along the longitudinal direction 55. Further, the viewing device 110 may include the alignment scale 85 that provides an indication of the degree of the misalignment between the turbine trailer 14 and generator trailer 16, if any. Further, in certain embodiments, the viewing device 110 may include the attachment feature 102 and/or the extension feature 104 that allows the viewing device 110 to have similar position (e.g., the retained position 106 and/or the released position 108) as the plurality of visual indicia 34.

As noted above, each visual indicia 34 of the plurality of visual indicia 34 may include a visual component disposed thereon. In particular, each visual indicia 34 of the plurality of visual indicia 34 may include a portion of the target visualization 64 (e.g., a portion of the complete pattern or picture) that is disposed thereon. For example, the first turbine indicia 94 may include a first portion 66 of the target visualization 64, the second turbine indicia 96 may include a second portion 68 of the target visualization 64, the first generator indicia 98 may include a third portion 70 of the target visualization 64, and the second generator indicia 98 may include a fourth portion 72 of the target visualization 64. Accordingly, when the first turbine indicia 94, the second turbine indicia 96, the first generator indicia 98, and the second generator indicia 98 are collectively viewed, each portion of the target visualization 64 collectively form the target visualization 64, as further described with respect to FIG. 3.

In certain embodiments, the visual indicia 34 may be the same size, while in other embodiments, the visual indicia 34 may be different sizes. Likewise, in certain embodiments, each visual component disposed on each visual indicia 34 may be the same size, while in other embodiments, each visual component disposed on each visual indicia 34 may be different sizes. In particular, in certain embodiments, the visual indicia 34 and/or the visual component disposed on the visual indicia 34 may be of progressively increasing and/or progressively decreasing size. For example, in the illustrated embodiment, the first turbine indicia 94 may be smaller than the second turbine indicia 96, the second turbine indicia 96 may be smaller than the first generator indicia 98, and the first generator indicia 98 may be smaller than the second generator indicia 100. In particular, the ratio of the differences in sizes may be designed to compensate for the distance of the visual indicia 34 from the operator 54. For example, the further the visual indicia 34 from the operator 54, the larger the visual indicia 34 is designed and positioned. Accordingly, when collectively viewed, the plurality of visual indicia 34 form a cohesive target visualization 64 that is not influenced by the distance of the visual indicia 34 from the operator 54, as further described in detail below.

FIG. 3 is an embodiment of the target visualization 64, as viewed through the viewing device 110 of the visual alignment system 10 of FIG. 2. As noted above, the operator 54 may utilize the viewing device 110 to collectively view the plurality of visual indicia 34. For example, in the illustrated embodiment, the operator may view the first portion 66, the second portion 68, the third portion 70, and the fourth portion 72 through the viewing device 110 to form the target visualization 64. In certain embodiments, the operator 54 may utilize the camera 58 (e.g., digital electronic camera) to view the plurality of visual indicia 34 and/or may view the plurality of visual indicia 34 with a naked eye. In particular, each visual indicia 34 of the plurality of visual indicia 34 may include a portion of the target visualization 64, such that when viewed collectively, a complete visual (e.g., picture or pattern) with aligned portions may be formed, as further described in detail below. Furthermore, when a complete visual is not formed or the portions of the complete visual are not aligned, the alignment scale 85 may be utilized to determine the degree of misalignment between the turbine trailer 14 and the generator trailer 16, as further described in detail below.

In certain embodiments, each visual indicia 34 of the plurality of visual indicia 34 may include a different portion of the target visualization 64. Indeed, in certain embodiments, each visual indicia 34 of the plurality of visual indicia 34 may visually fit together like pieces of a puzzle. For example, in the illustrated embodiment, the first portion 66, the second portion 68, the third portion 70, and the fourth portion 72 each include a different section of the target visualization 64. It should be noted that the target visualization 64 may be any type of visual that may be broken into several portions, such that each portion of the visual is disposed on a separate visual indicia 34 in a non-overlapping location or position. For example, in certain embodiments, the target visualization 64 may be composed of one or more geometrical shapes (e.g., square, dot, circle, lines, triangle, rectangle, oval, star, cross, pentagon, trapezoid, octagon, etc.), and each of the one or more geometrical shapes may be disposed on each of the plurality of visual indicia 34.

Further, in certain embodiments, the target visualization 64 may be arranged in one or more different patterns (e.g., concentric shapes, diagonal strips, horizontal stripes, vertical stripes, checkered, grid shaped, geometric patterns, etc.), and one or more portions of the pattern may be disposed on each of the plurality of visual indicia 34. In certain embodiments, the target visualization 64 may be any other type of visual that provides an indication of alignment. For example, the target visualization 64 may be a picture, text (e.g., "aligned," "misaligned," etc.), numerals, symbols (e.g., check mark, positive or negative symbols, smiley faces, arrows, etc.), and one or more portions of the visual may be disposed on each of the plurality of visual indicia 34. Further, in certain embodiments, different colors or gradients of color (e.g., red, yellow, green, blue, orange, purple, etc.) may be utilized on each of the plurality of visual indicia 34. In some situations, color may be utilized as a warning indication for the operator 54.

In certain embodiments, the operator 54 may utilize the alignment scale 85 to determine the degree of misalignment between the turbine trailer 14 and the generator trailer 16, if any. In the illustrated embodiment, the alignment scale 85 includes one or more alignment markings 112 that may correspond to a degree of misalignment between the turbine trailer 14 and the generator trailer 16. For example, each alignment marking 112 may correspond to an approximate distance of misalignment between the turbine trailer 14 and/or the generator trailer 16. Furthermore, the portion of the target visualization 64 that is misaligned relative to the other portions may be indicative of the location of misalignment within the field. For example, if the first portion 66 of the target visualization is not in alignment with the second portion 68, the third portion 72, and/or the fourth portion 74, the location on the turbine trailer 14 and/or turbine 14 associated with the first portion 66 may need to be adjusted to correct the misalignment. In certain embodiments, color coding of the visual indicia 34 may be utilized to show a degree of misalignment. For example, in certain embodiments, a border of the first portion 66 may be a different color than the first portion 66. Accordingly, if the first portion 66 of the target visualization is not in alignment with the second portion 68, the third portion 72, and/or the fourth portion 74, the operator may see the border and/or the warning color of the border of the first portion 66, and may utilize this information to adjust the turbine trailer 14 and/or the generator trailer 16 to correct the misalignment.

In this manner, misalignments between the turbine trailer 14 and the generator trailer 16 may be corrected or adjusted along the horizontal axis 55, vertical axis 57, and/or a rotational axis 59 (e.g., angled). For example, the operator 54 may utilize the target visualization 64 and/or the alignment scale 85 to determine whether the turbine trailer 14 and/or the generator trailer 16 are misaligned along the horizontal axis 55 and/or the vertical axis 57 (e.g., due to a vertical or horizontal movement of the turbine trailer 14 and/or generator trailer 16), and make the necessary adjustments. Likewise, the operator 54 may utilize the target visualization 64 and/or alignment scale 85 to determine whether the turbine trailer 14 and/or the generator trailer 16 are misaligned along the rotational axis 59, such as due to an angled movement of the turbine trailer 14 and/or the generator trailer 16 in the reverse direction 24.

Figure 4:
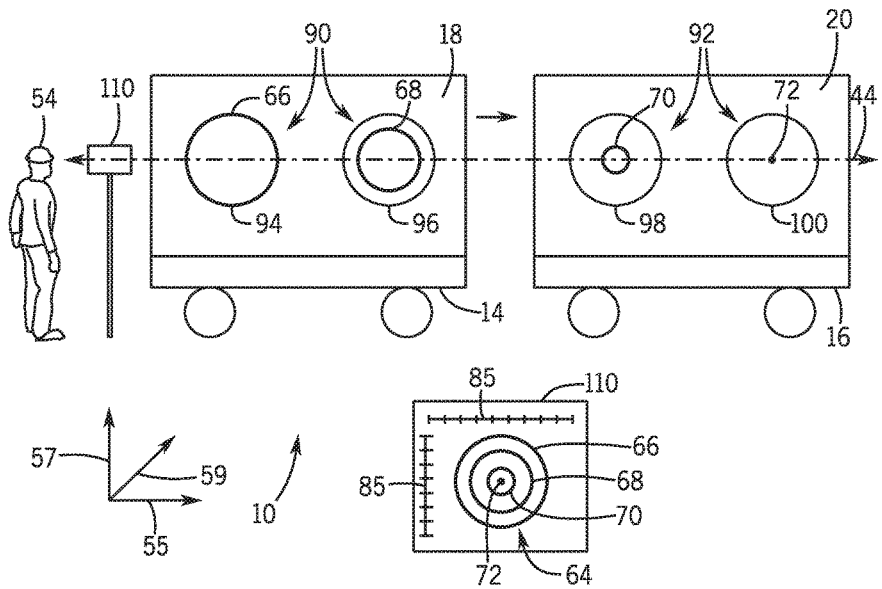
FIG. 4 is an embodiment of turbine indicia and generator indicia of the visual alignment system of FIG. 2, where turbine indicia and the generator indicia form a target visualization with aligned portions.

FIG. 4 is an embodiment of the turbine indicia 90 and generator indicia 92 of the visual alignment system 10 of FIG. 2, where turbine indicia 90 and the generator indicia 92 form the target visualization 64 with generally aligned portions 66, 68, 70, and 72. In the illustrated embodiment, the turbine indicia 90 and the generator indicia 92 are disposed on the first and second exterior surfaces 37, 38 of the turbine 18 and the generator 20. However, in other embodiments, the turbine indicia 90 and/or the generator indicia 92 may be disposed on the turbine trailer 14 and/or the generator trailer 16. In particular, the turbine indicia 90 may include the first turbine indicia 94 and the second turbine indicia 96, and the generator indicia 92 may include the first generator indicia 98 and the second generator indicia 100. As illustrated in the viewing device 110, the portions 66, 68, 70, and 72 (e.g., concentric circles or rings) disposed on the turbine indicia 90 and the generator indicia 92 define one or more concentric circles or rings and are generally aligned when the turbine trailer 14 and the generator trailer 16 are aligned. In certain embodiments, the viewing device 110 may include a portable scope with a stand or a base that may be positioned proximate to the turbine trailer 14 and/or generator trailer 16.

Figure 5:
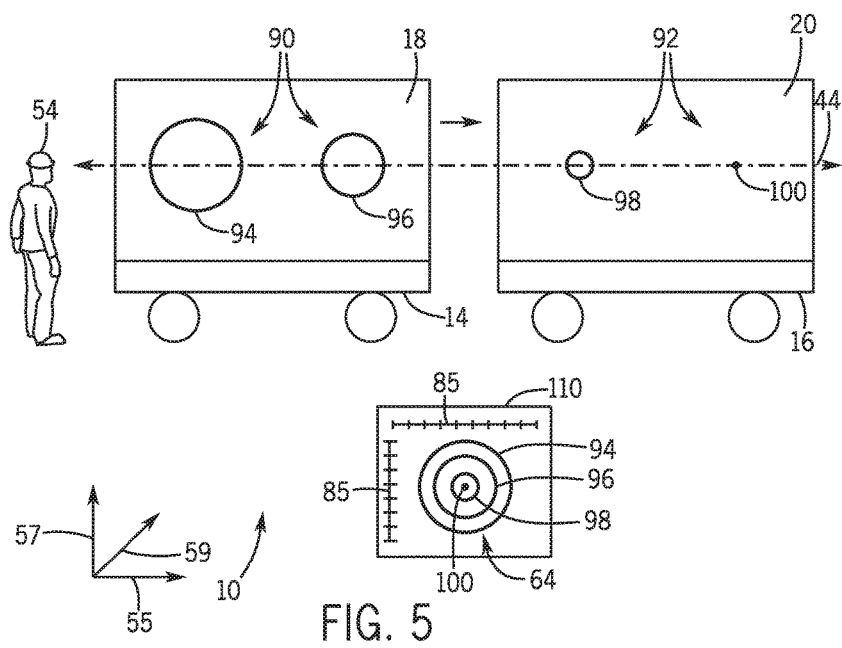
FIG. 5 is an embodiment of turbine indicia and generator indicia of the visual alignment system of FIG. 2, where turbine indicia and the generator indicia form the target visualization with aligned portions.

FIG. 5 is an embodiment of the turbine indicia 90 and generator indicia 92 of the visual alignment system 10 of FIG. 2, where turbine indicia 90 and the generator indicia 92 form the target visualization 64 with generally aligned turbine indicia 90 and generator indicia 92. In the illustrated embodiment, the turbine indicia 90 and the generator indicia 92 are disposed on the first and second exterior surfaces 37, 38 of the turbine 18 and the generator 20. However, it should be noted that in other embodiments, the turbine indicia 90 and/or the generator indicia 92 may be disposed on the turbine trailer 14 and/or the generator trailer 16.

In particular, the turbine indicia 90 may include the first turbine indicia 94 and the second turbine indicia 96, and the generator indicia 92 may include the first generator indicia 98 and the second generator indicia 100. In certain embodiments, the first turbine indicia 94, the second turbine indicia 96, the first generator indicia 98, and/or the second generator indicia 100 may be different sizes or shapes (e.g., concentric circles and/or rings). In certain embodiments, the first turbine indicia 94, the second turbine indicia 96, the first generator indicia 98, and/or the second generator indicia 100 may a hollow circular shaped (e.g., ring shaped, hoop shaped, etc.) indicia of various sizes (e.g., decreasing size along the line of sight 44). For example, the first turbine indicia 94 may be larger ring than the second generator indicia 100. Accordingly, when viewed together, as illustrated in the viewing device 110, the turbine indicia 90 and the generator indicia 92 are generally aligned when the turbine trailer 14 and the generator trailer 16 are aligned.

Figure 6:
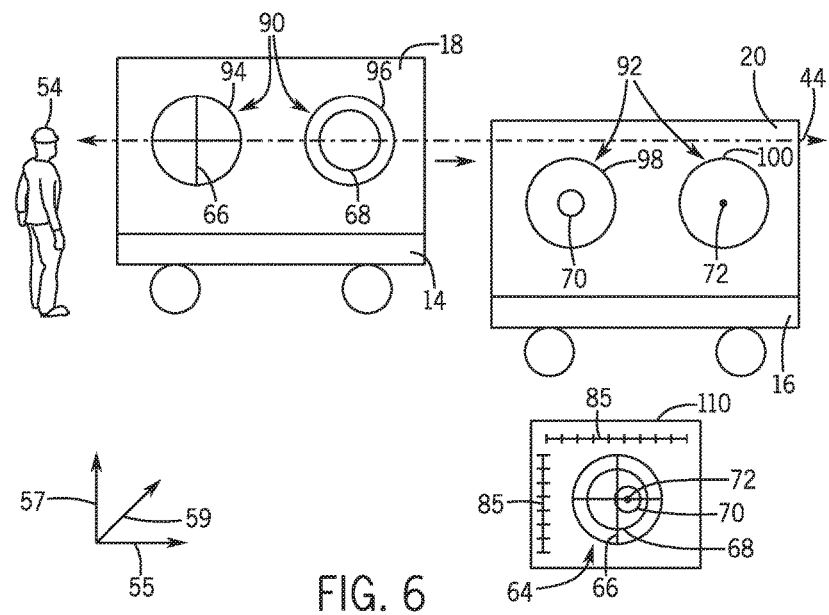
FIG. 6 is an embodiment of turbine indicia and generator indicia of the visual alignment system of FIG. 2, where turbine indicia and the generator indicia form a target visualization with misaligned portions.

FIG. 6 is an embodiment of the turbine indicia 90 and generator indicia 92 of the visual alignment system 10 of FIG. 2, where turbine indicia 90 and the generator indicia 92 form the target visualization 64 with generally misaligned portions 66, 68, 70, and 72. In particular, in the illustrated embodiment, the turbine trailer 14 may be misaligned with the generator trailer 16, which may result in a misaligned coupling between the turbine 18 and the generator 20. Accordingly, in certain embodiments, the operator 54 collectively viewing the turbine indicia 90 and the generator indicia 92 may utilize the misaligned portions (e.g., portions 66, 68, 70, and 72) as indicative of the misalignment between the turbine indicia 90 and the generator indicia 92 and may make the necessary adjustments to the turbine trailer 14 and the generator trailer 16.

In the illustrated embodiment, the turbine indicia 90 and the generator indicia 92 are disposed on the first and second exterior surfaces 37, 38 of the turbine 18 and the generator 20. However, it should be noted that in other embodiments, the turbine indicia 90 and/or the generator indicia 92 may be disposed on the turbine trailer 14 and/or the generator trailer 16. In particular, the turbine indicia 90 may include the first turbine indicia 94 and the second turbine indicia 96, and the generator indicia 92 may include the first generator indicia 98 and the second generator indicia 100. In particular, the portions 66, 68, 70, and 72 may be disposed the first turbine indicia 94, the second turbine indicia 96, the first generator indicia 98, and the second generator indicia 100, respectively. The first turbine indicia 94 may include a large perimeter circle with a cross extending through the large perimeter circle. Further, the second turbine indicia 96, the first generator indicia 98, and the second generator indicia 100 may include a circles or rings of decreasing sizes.

As illustrated in the viewing device 110, the portions 66, 68, 70, and 72 disposed on the turbine indicia 90 and the generator indicia 92 are generally misaligned when the turbine trailer 14 and the generator trailer 16 are misaligned. In the illustrated embodiment, an operator 54 may utilize the alignment scale 85 to measure the misalignment between the first and second portions 66, 68 and the third and fourth portions 70, 72 on the viewing device 110. In particular, the alignment markings 112 may be utilized to measure the misalignment between the first and second portions 66, 68 and the third and fourth portions 70, 72 to get an indication of the adjustments that need to be made between the turbine trailer 14 and the generator trailer 16.

Figure 7:
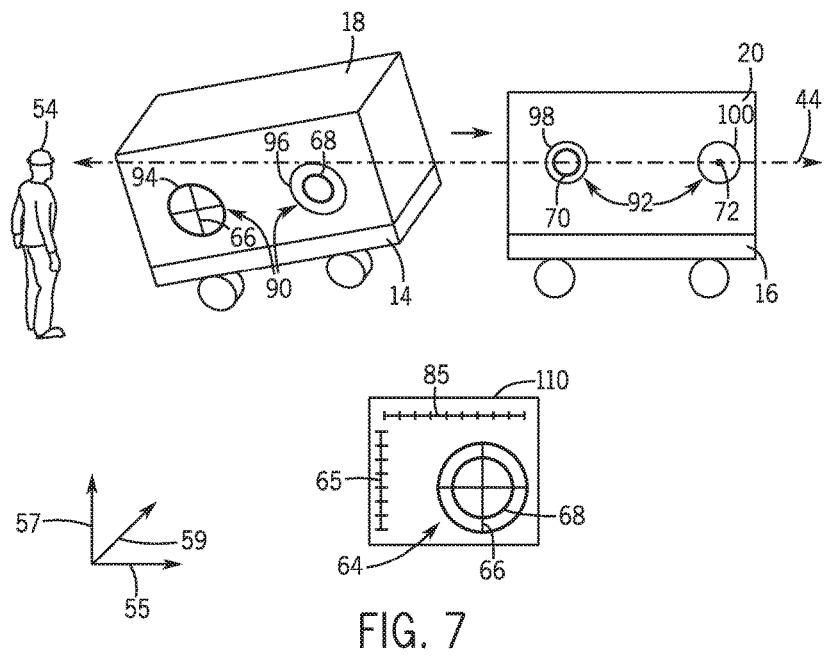
FIG. 7 is an embodiment of turbine indicia and generator indicia of the visual alignment system of FIG. 2, where turbine indicia and the generator indicia form a target visualization with misaligned portions.

FIG. 7 is an embodiment of the turbine indicia 90 and generator indicia 92 of the visual alignment system 10 of FIG. 2, where turbine indicia 90 and the generator indicia 92 form the target visualization 64 with portions 66 and 68. In particular, in the illustrated embodiment, the turbine trailer 14 may be misaligned with the generator trailer 16, which may result in a misaligned coupling between the turbine 18 and the generator 20. Accordingly, in certain embodiments, the operator 54 collectively viewing the turbine indicia 90 and the generator indicia 92 may utilize the portions 66 and 68 to make the adjustments to the turbine trailer 14 and the generator trailer 16 so that they are properly aligned. In the illustrated embodiment, one or more portions of the target visualization 64 may not be seen on the viewing device 110. For example, in certain situations, the misalignment between the turbine trailer 14 and generator trailer 16 may result in one or more portions (e.g., the third portion 70 and the fourth portion 72) to not appear on the target visualization. Accordingly, the operator 54 may make necessary adjustments to the turbine trailer 14 and generator trailer 16 before utilizing the visual alignment system 10 to align the turbine trailer 14 and generator trailer 16.

Figure 8:
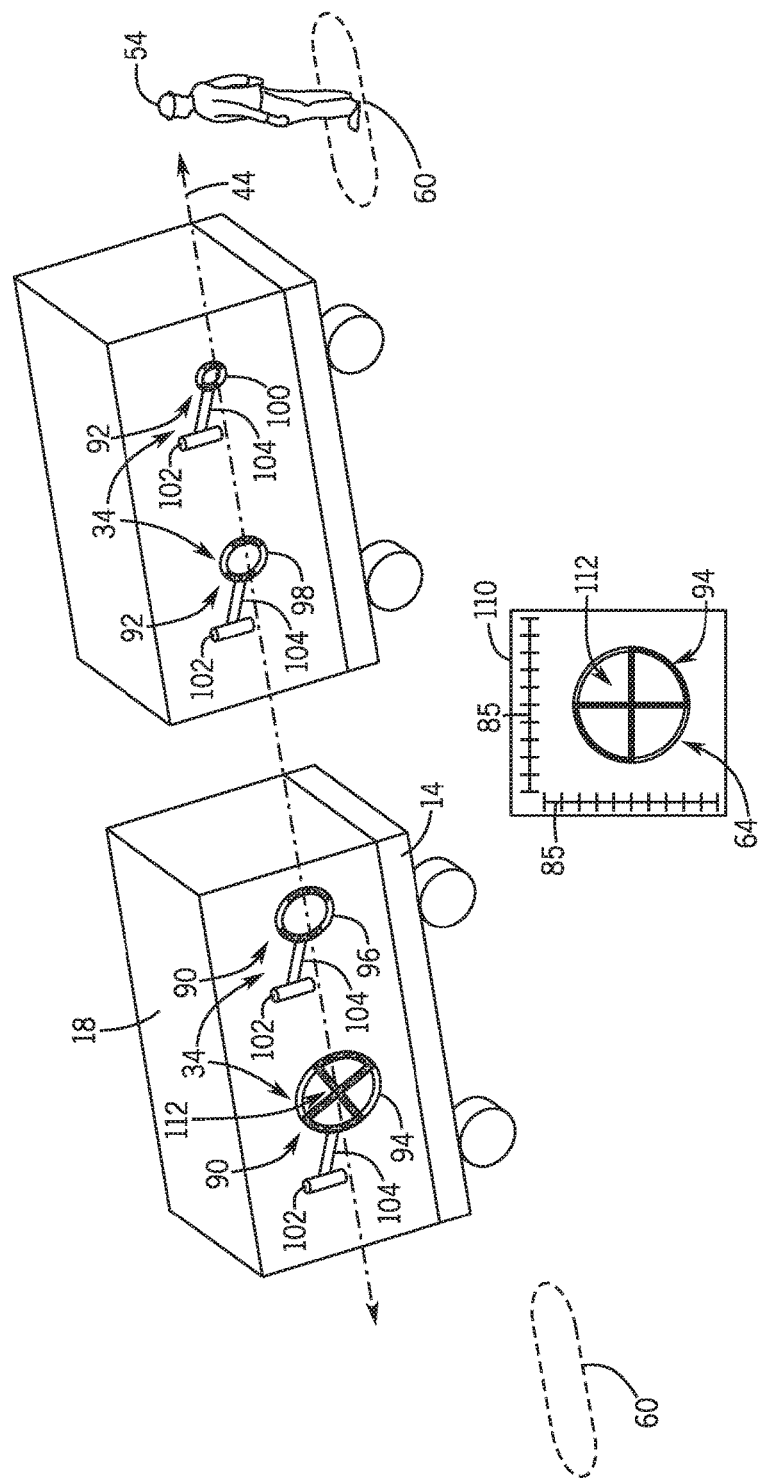
FIG. 8 is an embodiment of turbine indicia and generator indicia of the visual alignment system of FIG. 2, where the turbine indicia and the generator indicia form a target visualization with misaligned portions.

FIG. 8 is an embodiment of turbine indicia 90 and generator indicia 92 of the visual alignment system 10 of FIG. 2, where turbine indicia 90 and the generator indicia 92 form the target visualization 64. As noted above, the turbine indicia 90 and the generator indicia 92 may be utilized to align the turbine trailer 14 with the generator trailer 16, thereby aligning the turbine 18 with the generator 20. In the illustrated embodiment, the turbine indicia 90 and the generator indicia 92 are disposed on the first and second exterior surfaces 37, 38 of the turbine 18 and the generator 20. However, in other embodiments, the turbine indicia 90 and/or the generator indicia 92 may be disposed on the turbine trailer 14 and/or the generator trailer 16. In particular, the turbine indicia 90 may include the first turbine indicia 94 and the second turbine indicia 96, and the generator indicia 92 may include the first generator indicia 98 and the second generator indicia 100.

In particular, in certain embodiments, the operator 54 may collectively view the turbine indicia 90 and the generator indicia 92. In certain embodiments, the first turbine indicia 94, the second turbine indicia 96, the first generator indicia 98, and the second generator indicia 100 may be gradually increasing or gradually decreasing in size (e.g., disappearing pattern of diminishing size and/or an appearing pattern of increasing size). For example, in the illustrated embodiment, the first turbine indicia 94, the second turbine indicia 96, the first generator indicia 98, and the second generator indicia 100 are gradually decreasing in size along the line of sight 44. For example, in certain embodiments, when the operator 54 collectively views the turbine indicia 90 and the generator indicia 92, only the first turbine indicia 94 may be visible. Indeed, as illustrated in the viewing device 110, in certain embodiments, only the first turbine indicia 94, and the one or more features 112 disposed on the first turbine indicia 94 may be viewed by the operator 54. Furthermore, in certain embodiments, viewing any of the other turbine indicia 90 and/or the generator indicia 92 may be indicative of misalignment between the turbine trailer 14 and the generator trailer 16.

As noted above, different colors or gradients of color (e.g., red, yellow, green, blue, orange, purple, etc.) may be utilized on each of the plurality of visual indicia 34. Further, as noted above, one or more different patterns (e.g., concentric shapes, diagonal strips, horizontal stripes, vertical stripes, checkered, grid shaped, geometric patterns, etc.), text (e.g., "aligned," "misaligned," etc.), numerals, symbols (e.g., check mark, positive or negative symbols, smiley faces, arrows, etc.), or any combination thereof, may be utilized on each of the plurality of visual indicia 34. In particular, any combination of these features may be utilized for one or more visual indicia 34, in order to create a cohesive overall pattern for the visual alignment system 10. For example, any combination of these features may be utilized for the one or more visual indicia 34, such that they fit together like pieces of a puzzle to form the target visualization 64. In the illustrated embodiment, one or more colors (e.g., red, yellow, green, blue, orange, purple, etc.) may be utilized in one or more patterns on the first turbine indicia 94. Accordingly, in certain embodiments, the color and/or patterns disposed on the visual indicia 34 may be utilized to determine proper alignment. For example, an operator 54 collectively viewing the visual indicia 54 may determine that the turbine trailer 14 with the generator trailer 16 are misaligned if the target visualization 64 includes multiple shapes and/or non-uniform color from the second turbine indicia 96, the first generator indicia 98, and/or the second generator indicia 100.

Technical effects of the invention include the visual alignment system 10 configured to aid in the alignment of the gas turbine trailer 14 with the generator trailer 16, thereby aligning the gas turbine 18 with the generator 20. The visual alignment system 10 may include a plurality of visual indicia 34 disposed on exterior surface of the turbine 18 and/or the turbine trailer 14 and a plurality of visual indicia 34 disposed on the exterior surfaces of the generator 20 and/or the generator trailer 16. In particular, each visual indicia 34 of the plurality of visual indicia 34 may incorporate a visual portion (e.g., 66, 68, 70, or 72) of the target visualization 64. For example, the target visualization 64 may be a complete pattern or picture that is viewed by the operator 54 and/or captured by the camera 58.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An alignment system, comprising:
a first visual indicia and a second visual indicia disposed on a first mobile unit;
a third visual indicia and a fourth visual indicia disposed on a second mobile unit; and
a visual inspection area configured to enable collective viewing of the first visual indicia, the second visual indicia, the third visual indicia, and the fourth visual indicia along a single direction, wherein the alignment system is configured to align the first mobile unit with the second mobile unit along a vertical axis, a horizontal axis, and a rotational axis to help align a rotational coupling between a first rotary machine on the first mobile unit and a second rotary machine on the second mobile unit.

2. The alignment system of claim 1, comprising the first rotary machine including a turbine engine disposed on the first mobile unit, and the second rotary machine including a generator disposed on the second mobile unit, wherein the first and second mobile units are removably coupled together.

3. The alignment system of claim 2, wherein the first mobile unit comprises a first trailer and the second mobile unit comprises a second trailer.

4. The alignment system of claim 2, wherein the alignment system is configured to guide a coupling between the first and second mobile units to help align the turbine engine with the generator.

5. The alignment system of claim 1, comprising a camera disposed within the visual inspection area and configured to capture a visual of a target visualization, wherein the target visualization comprises the first visual indicia, the second visual indicia, the third visual indicia, and the fourth visual indicia.

6. The alignment system of claim 1, wherein the visual inspection area is configured to enable an operator to collectively view the first visual indicia, the second visual indicia, the third visual indicia, and the fourth visual indicia.

7. The alignment system of claim 6, wherein the first visual indicia, the second visual indicia, the third visual indicia, and the fourth visual indicia, when viewed collectively, form a target visualization.

8. The alignment system of claim 7, wherein the target visualization is an indication of alignment between the first mobile unit and the second mobile unit when the first visual indicia, the second visual indicia, the third visual indicia, and the fourth visual indicia are aligned relative to one another.

9. The alignment system of claim 7, wherein the target visualization is an indication of misalignment between the first mobile unit and the second mobile unit when the first visual indicia, the second visual indicia, the third visual indicia, and the fourth visual indicia are misaligned relative to one another.

10. The alignment system of claim 1, comprising a viewing scope disposed within the visual inspection area, wherein the viewing scope is configured to enable an operator to obtain a visual of a target visualization, wherein the target visualization comprises the first visual indicia, the second visual indicia, the third visual indicia, and the fourth visual indicia.

11. The alignment system of claim 1, wherein each of the first visual indicia, the second visual indicia, the third visual indicia, and the fourth visual indicia comprise a visual portion of a target visualization, and each visual portion is visible and aligned to complete the target visualization when the first and second mobile units are aligned along the vertical axis, the horizontal axis, and the rotational axis to help align the rotational coupling.

12. The alignment system of claim 11, wherein the target visualization comprises one or more shapes, patterns, colors, symbols, text, pictures, or any combination thereof.

13. A system, comprising:
a first visual indicia and a second visual indicia disposed on a first mobile unit that supports a turbine engine;
a third visual indicia and a fourth visual indicia disposed on a second mobile unit that supports a generator; and
a visual inspection area configured to enable collective viewing of the first visual indicia, the second visual indicia, the third visual indicia, and the fourth visual indicia along a single direction, wherein the alignment system is configured to align the first mobile unit with the second mobile unit along a vertical axis, a horizontal axis, and a rotational axis to help align a rotational coupling between the turbine engine and the generator.

14. The system of claim 13, wherein the first mobile unit comprises a first trailer and the second mobile unit comprises a second trailer.

15. The system of claim 14, wherein the first and second visual indicia are configured to mount along a longitudinal axis of a spine of the first mobile unit, and wherein the third and fourth visual indicia are configured to mount along a longitudinal axis of a spine of the second mobile unit.

16. The system of claim 13, comprising a control system configured to receive a target visualization from the visual inspection area, wherein the target visualization comprises the first visual indicia, the second visual indicia, the third visual indicia, and the fourth visual indicia.

17. The system of claim 16, wherein the control system comprises an alignment scale configured to measure a degree of misalignment between one or more portions of the target visualization.

18. A system, comprising:
a first trailer supporting a turbine engine;
a second trailer supporting a generator;
an alignment system configured to help align a coupling between the first trailer and the second trailer along a vertical axis, a horizontal axis, and a rotational axis, wherein the alignment system comprises:
a first visual indicia and a second visual indicia disposed on the first trailer;
a third visual indicia and a fourth visual indicia disposed on the second trailer; and
a control system configured to receive a visual of a target visualization, wherein the target visualization comprises the first visual indicia, the second visual indicia, the third visual indicia, and the fourth visual indicia along a single direction.

19. The system of claim 18, wherein the target visualization is an indication of alignment between the first trailer and the second trailer when the first visual indicia, the second visual indicia, the third visual indicia, and the fourth visual indicia are aligned relative to one another, wherein the target visualization is an indication of misalignment between the first trailer and the second trailer when the first visual indicia, the second visual indicia, the third visual indicia, and the fourth visual indicia are misaligned relative to one another.

20. The system of claim 18, wherein the alignment system is configured to help align and connect the coupling between the turbine engine on the first trailer and the generator on the second trailer along the vertical axis, the horizontal axis, and the rotational axis.

\* \* \* \* \*